Aug. 24, 1926.  
J. O. BENTLEY  
OSCILLOGRAPH TIMER  
Filed March 7, 1922

Inventor  
Jetson O. Bentley,  
By  
Attorney

Aug. 24, 1926.

J. O. BENTLEY 1,597,174

OSCILLOGRAPH TIMER

Filed March 7, 1922    8 Sheets-Sheet 5

Inventor
Jetson O. Bentley

By
Attorney

Aug. 24, 1926.

J. O. BENTLEY 1,597,174

OSCILLOGRAPH TIMER

Filed March 7, 1922     8 Sheets-Sheet 6

Inventor
Jetson O. Bentley,
By
Attorney

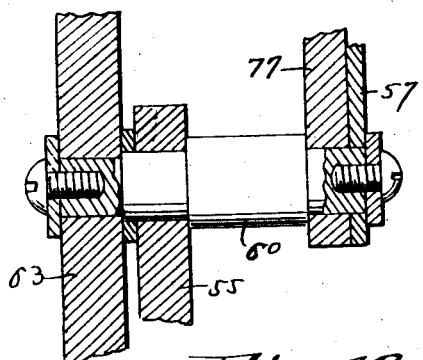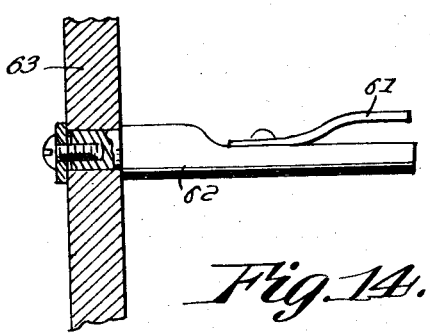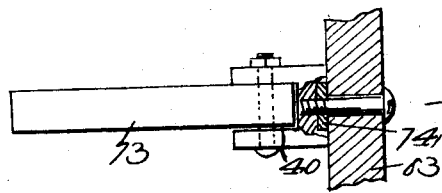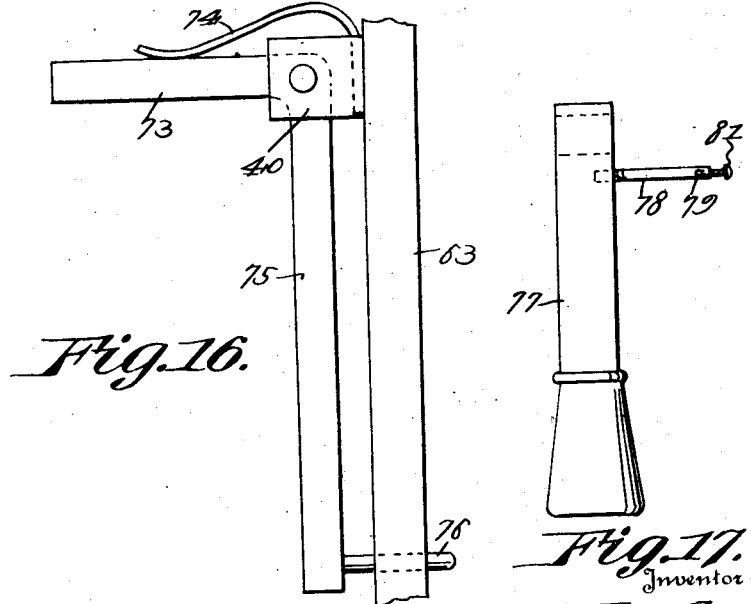

Patented Aug. 24, 1926.

1,597,174

UNITED STATES PATENT OFFICE.

JETSON O. BENTLEY, OF SCHENECTADY, NEW YORK.

OSCILLOGRAPH TIMER.

Application filed March 7, 1922. Serial No. 541,887.

The object of the invention primarily is to provide a timing device for use in connection with an oscillograph which fundamentally consists of a photoelectric device for recording electrical currents and voltages which being generally of a transitory nature require that the oscillograph be adapted to record rapid variations or changes. To this end the oscillograph consists essentially of a galvanometer, a source of light, a film contained in a proper holder by which it is protected from light except in a particular direction and a mechanism whereby the film can be exposed as it passes within the range of the light reflected from the galvanometer through a restricted area or along a narrow line prescribed by a slit in the film holder. Using for example a galvanomter of the d'Arsonval type the moving coil may consist of a single loop of light weight suspended under spring tension in a concentrated electrical field produced by large electrical magnets to effect a high natural frequency, while attached to the coil is a minute mirror designed to reflect the light thrown upon it from an arc light with such adjustment as to provide for the light beam being projected through a narrow slit in the light proof film holder wherein the film is carried by a rotatable drum. Ordinarily the film is made of a length exactly corresponding with the circumference of the drum, and when arranged in proper position the slit in the film holder coincides with the corresponding slit in the end of the oscillograph and in order to obtain a linear displacement on the film of the vibrating beam of light the film must be rotated at the time of its exposure. This is accomplished by means of a suitable motor driving a shaft which engages the shaft of the drum and in order that the exposure may be made for only one revolution of the film to avoid confusion or overlapping it is obvious that the apparatus must include shutter mechanism by which the exposure of the film may be controlled, and in this connection it will also be obvious that the control of the shutter mechanism must be timed with relation to the rotation of the film drum.

Heretofore the control of these elements in the use of an apparatus of this type has been manual and has evolved the employment of what are known generally as the selective shutter and the instantaneous shutter methods, of which, however, both are open to objection on the basis of accuracy particularly because of the personal equation involved and the fact that the releasing means for the elements, consisting of triggers, circuit closers, switches and the like involve a time element in their operation, and because the current which is to be measured or tested likewise involves a time element in building up to its full strength after a switch has been closed. When the film is rotating for example at three hundred R. P. M. the exposure is only for a period of two-tenths of a second, and not only is time consumed in the movement of the shutter to its open position after the trigger or release has been actuated, but the time delay involved therein is indefinite in length and can not accurately be compensated for under the conditions which exist in either of the methods above noted. This disadvantage is particularly noticeable in operating under high speeds, and while it is true that the instantaneous shutter method was employed as a means of overcoming these disadvantages by co-ordinating the opening of the shutter and the occurrence of the phenomenon, the only advantage resulting therefrom resides in the fact that the film exposure starts immediately upon the release of the film or the pulling of the trigger, and even with this advantage a high order of skill is required to operate both the shutter and the test circuit so that the phenomenon or representation will occur on the film, and the number of errors or "misses", particularly with a high film speed are of such frequency as to render the use of the device expensive and largely inconclusive and unsatisfactory.

Therefore it is the object of this invention to provide a mechanical means for timing the oscillograph so that absolute accuracy in the exposure and closing of the test circuit may be attained under conditions absolutely eliminating the personal factor and providing for the operation of the oscillograph without the qualification of skill on the part of the operator and under conditions assuring absolute uniformity and accuracy in recording the results of the tests, and while the illustrated and strictly typical embodiment of the invention as represented in the accompanying drawings is more especially adapted, particularly in the mounting of the elements, for application to and use in connection with the type of oscillograph employed by the General Electric Company, it will be understood that this form of illustration has merely been adopted for convenience and that the principles involved both in operation and construction are likewise applicable to other forms of oscillographs.

In the drawings wherein corresponding reference characters designate like parts in the several views.

Figure 2:
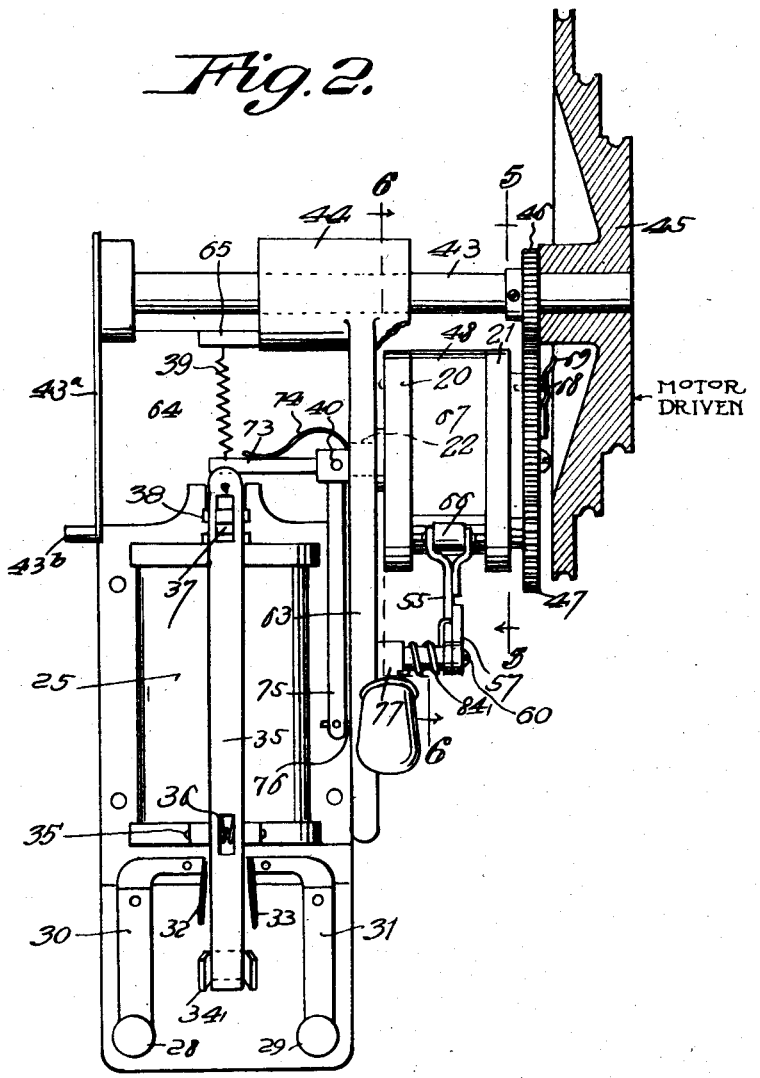
Figure 2 is a front view of the mechanism, the pulley being shown in section.
Figures 5, 6, 7:
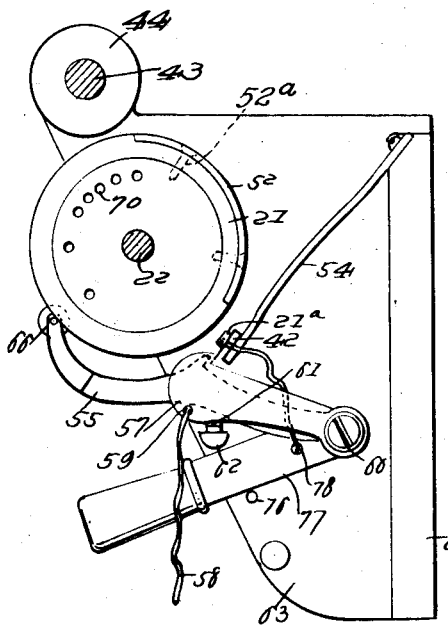

Figures 5 and 6 are sectional views taken respectively on the planes indicated by the lines 5—5 and 6—6 of Figure 2.

Figure 7 is a detail sectional view of the drum by which the circuit closing contacts are carried.

Figure 8:
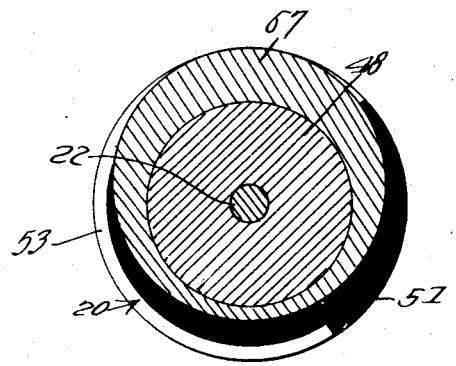

Figure 8 is a detail sectional view on the plane indicated by the line 8—8 of Figure 7.

Figures 9, 10:
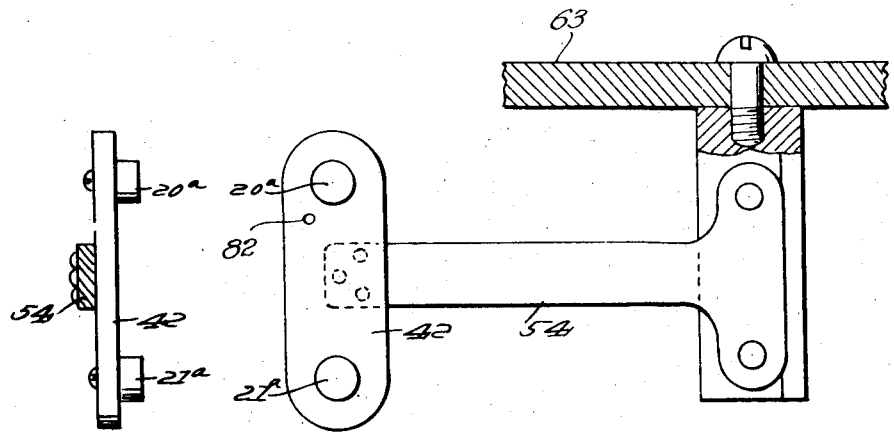

Figures 9 and 10 are plan and cross sectional views respectively of the contact arm.

Figure 11:
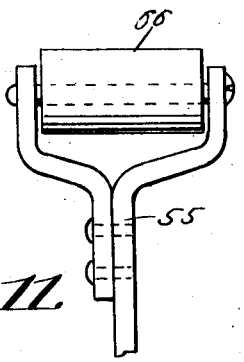

Figure 11 is a detail view of the cam engaging traveller.

Figure 12:
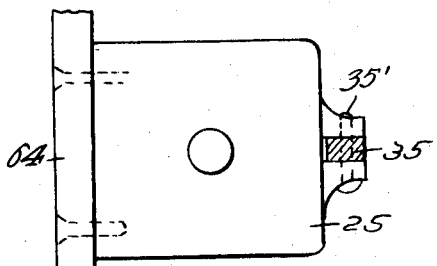

Figure 12 is a plan view of the circuit closing magnet.

Figure 13 is a detail sectional view of the spindle by which the trip arms are carried, showing in section portions of the parts mounted thereon.

Figure 14 is a detail view of the stop pin which is arranged in the path of movement of the trigger.

Figure 15 is a plan view of the trip arm arranged in the path of retracted movement of the armature which is controlled by the circuit closing magnet.

Figure 16 is a side view of said trip arm showing its connection with the pin which normally supports the release arm.

Figure 17 is a detail view of the release arm and the means whereby connection is made between the same and the contact arm.

Figure 18:
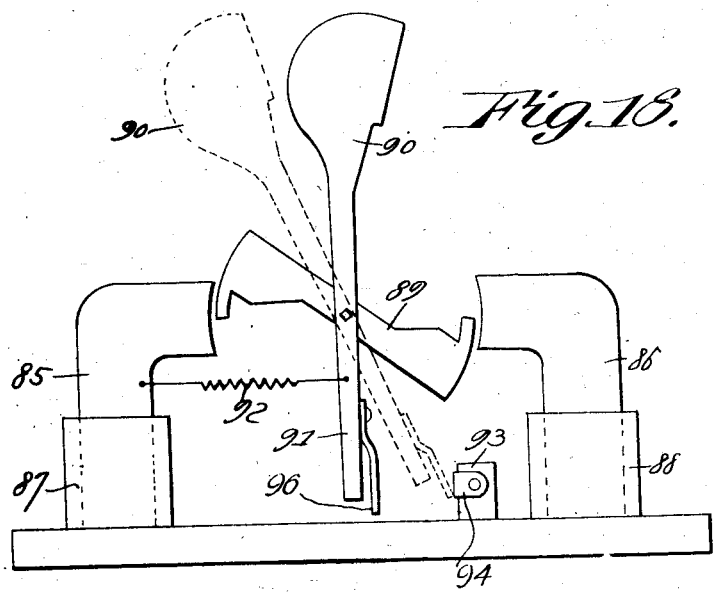

Figure 18 is a detail view of a shutter mechanism suitable for use in connection with the apparatus.

Figure 19:
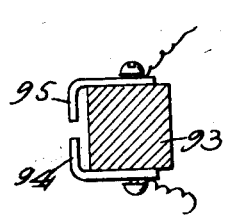
Figure 20:
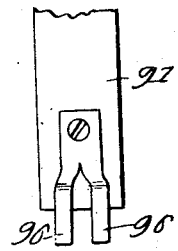

Figures 19 and 20 are views of the contact elements used for closing a supplemental or shunt circuit in connection with the shutter mechanism.

The principle of operation embodied in the mechanism involves the use of a dual circuit closer of which the members include rotary elements 20 and 21 (referring particularly to the diagram Figure 1) carried by a shaft 22 which is actuable by the film motor (not shown) and therefore in synchronism with the film and oscillatory complemental elements $20^a$ and $21^a$ which are included in circuit 23 which also includes respectively the shutter mechanism 24 and a trip magnet 25 of the electromagnet type with a source of energy through the terminals represented by binding posts 26 and 27 which in practice may form the terminals of a supply circuit of D. C. current of say one hundred and twenty-five volts, the terminal 27 being grounded at $27^a$ as the elements 20, 21 are grounded at $23^x$.

The test circuit is adapted for connection with binding posts 28 and 29 connected by bus bars 30 and 31 with the contacts 32 and 33 between which is adapted to be fitted a contact 34 constituting a circuit closer, said movable contact 34, for example being carried by a movable arm or lever 35 pivoted at 35' and yieldingly actuable to closed position by the spring 36 and normally held in open position by a latch 37 carrying an armature 38 in the field of the trip coil or magnet 25, so that when the trip circuit 23 is closed the energization of the trip coil or magnet 25, causes the release of the circuit closer element 34 and permits it to engage the elements 32 and 33 under the influence of the spring 36 to close the test circuit. The latch 37, however, is yieldingly retractable by a spring 39 or its equivalent so as to be restored as soon as the coil circuit 23 is broken or interrupted and in the path of the latch is arranged a trip 40 serving to release a non-repeat mechanism operatively connected with the carrier 42 which supports the oscillatory contact elements $20^a$ and $21^a$ to withdraw them from the path of the rotary or progressively movable contacts or circuit closer elements 20 and 21.

In the illustrated form of mechanism embodying this general system a rotary drive shaft 43 mounted in a suitable bearing 44 carries a pulley 45 adapted to be traversed by a suitable belt from the film motor and also carrying a pinion 46 meshing with a gear 47 having a ratio as illustrated of one to three, said gear being mounted upon the spindle 22 which carries as above indicated the rotary elements 20 and 21 of the circuit closer. The film drum (not shown) is driven by the shaft 43 through an arm $43^a$ carrying lug $43^b$.

Mounted upon the spindle 22 is a main core 48 and a supplemental core 49, upon which are fitted rings 50 and 51 of fiber or other insulating material respectively carrying electrically conductive contact plates 52 and 53 representing the circuit closer elements 21 and 20 for engagement by the contact elements $21^a$ and $20^a$ in the course of the rotation of the rings.

The contact elements $20^a$ and $21^a$ through the carrier 42 are supported by a spring arm 54 secured to a fixed member of the frame and having an impulse toward the carrier rings 50, 51, which impulse, however, is normally resisted by a delay trip arm 55 having a catch 56 which is engaged with the carrier 42 and a trigger 57 also normally engaged with said carrier and adapted to be tripped or disengaged therefrom by means of a pull cord 58 or any equivalent thereof engaged with a suitable opening 59. Said delay trip arm and trigger are coaxially mounted pivotally by means of a spindle 60 or its equivalent and are yieldingly held in engaging relation with the carrier 42, the trigger being movable to engaging position by a spring finger 61 carried by a stop arm 62 suitably supported in the path of said trigger from a side plate 63 of the frame, said side plate being the means for supporting the bearing 44 and in the construction illustrated being extended from a base plate 64 which also carries a web 65 extending forward to the bearing 44.

The traveller 66 on the trip arm 55 is adapted to traverse a cam 67 which is revolubly adjustable on the core 48 and is designed by actuating said trip arm to release the spring contact carrying arm 54, but such release is possible only after the trigger 57 has been manually disengaged from the contact arm and the impulse of the carrier 42 thereby transferred to the tooth or catch 56 of the delay trip arm. By adjusting the relative positions of the cam and the contact strips 52 and 53 the closing of the circuits through the trip coil 25 and the shutter 24 may be regulated with accuracy. The core 48 is angularly adjustable with reference to the gear 47 by means of a pin 68 actuable by spring 69 and selectively engageable with sockets 70 of which an annular series is provided in one side of the core, and the supplemental core 49, similarly, is angularly adjustable by means of screw 71 threaded into the core 48 and extending through an arcuate slot 72 in the supplemental core 49.

By the adjustment of these parts the lead of either of the contact segments 52 and 53 over the other or the arrangement of their ends at zero or opposite each other may be had and the drop of the brushes 20ª and 21ª on the rings 50 and 51 for contact with the plates or segments may as indicated be controlled by the angular adjustment of the cam 67 on the core. The cam is frictionally held in adjusted positions and screws 52ª and 53ª which secure the plates or segments in place extend through the rings 50 and 51 to electrically connect same with the core members which may be of brass or other conductive material.

As previously stated it is desirable to have the elements of the mechanism so related as to insure the engagement of the brushes 20ª and 21ª with the segments 52 and 53 in co-ordinating operation with the other features of the mechanism including the closing of the switch of the test circuit, and therefore while the spring arm 54 is normally held retracted and is locked against movement toward the drum, when the apparatus is not in operation, by means of the trigger 57, the release of the arm 54 by the retraction of the trigger 57 imposes the responsibility of releasing the brushes for movement into engaging relation with the contact segments 52 and 53 upon the trip arm 55 which being subject in its position to the operation of the cam 67 which operates synchronously with the contact segments is adapted by its adjustment to release the arm 54 at exactly the proper moment. Thus when the device is to be started for the purpose of making a test, the first operation is to disengage the arm 54 from the trigger 57, after which the ultimate release of the brush carrying arm is controlled automatically.

Figure 3:
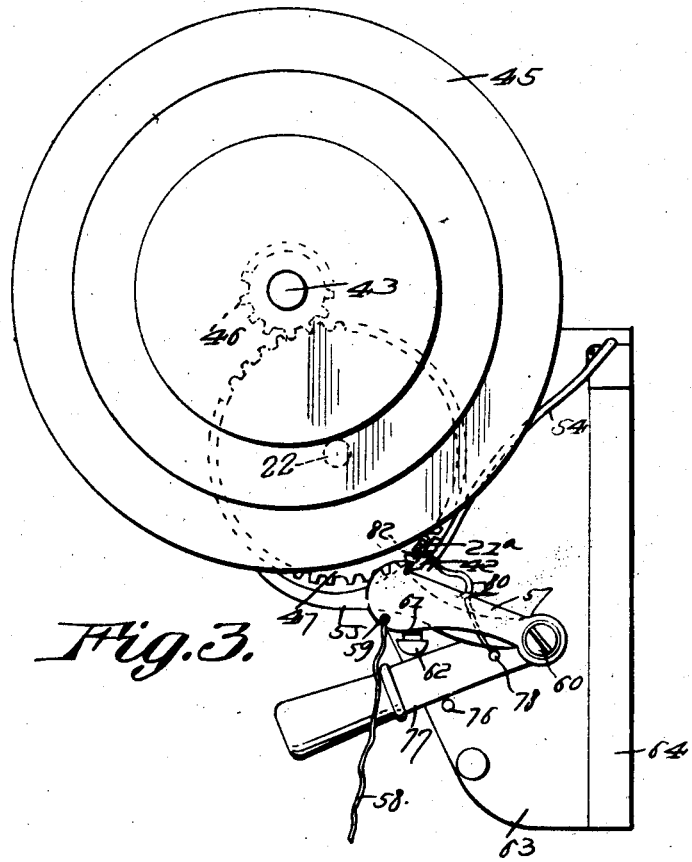
Figure 3 is a side view of the same.
Figure 4:
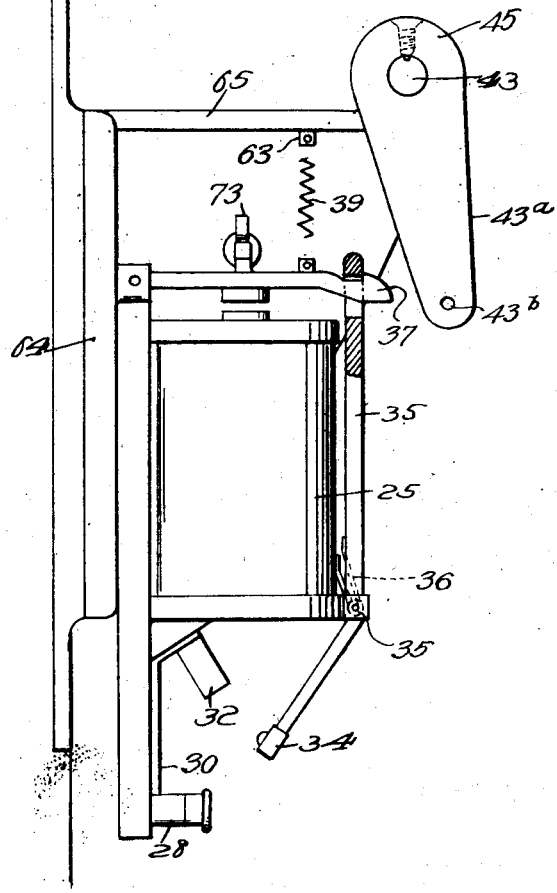
Figure 4 is a view of the opposite side from that shown in Figure 3.

In order that when the circuit controlling the shutter has been opened and that through the trip coil is discontinued, any repetition and confusion of the record on the film may not occur, there is employed what may for convenience be termed a non-repeat or throw-off mechanism which, while normally neutral or dormant, is set or released by the release of the latch 37 of the trip coil 25, and which includes the rocking trip 40, (Figures 1—4—15—16), previously mentioned, which is provided in the path of the movement of the armature carrying arm 37 with a trip arm 73 (Figure 16), yieldingly held in its normal position by a spring 74 and which is also provided with arm 75 carrying a rest pin 76 for normally supporting a release arm 77 operatively connected with the brush carrier 42. As illustrated the release arm has a lateral pin 78 (Figure 3) provided with an opening 79 (Figure 17) through which extends a cord or flexible connection 80 and secured by a set screw 81, said connection extending from the brush head or barrier 42 to which it is secured in an opening 82 and the adjustment thereof by set screw 81 being such that when the release arm 77 is supported by the rest pin 76 the connection is loose or slack. When, however, the rest pin is withdrawn as above described and permits the release arm to drop, it strains the connection and withdraws the brushes from operative relation with the contact strips and the rings by which they are carried. The arm 77 and trip arm 55 are mounted upon the common spindle 60 and are actuated by a common spring 84 which tends to depress the former and which is tensioned by restoration thereof to hold the latter with its roller in contact with the cam 67. Spring 84 shall have a sufficient number of turns around spindle 60 so that there will still be tension against 55, even with 77 in its lowest position. The tension of spring 84 transmitted thru pin 78 and cord 80 upon the release of arm 77 by the withdrawal of the pin 76, also may be sufficient to retract the brush carrier 42, in opposition to the tension of the supporting arm 54 sufficiently to engage the carrier with the trigger 57 and thereby lock the parts against reopening of the shutter at the time of withdrawing the brush elements $20^a$ and $21^a$ from the paths of the revolubly progressive elements 20 and 21 of the circuit closer.

In Figure 18 there is shown a typical form of shutter mechanism in which the poles 85 and 86 of the magnets 87 and 88 are spaced to receive a rocking armature 89, carrying the shutter 90 of which the stem 91 is provided with a return spring 92. When the mechanism is set by an adjustment of the progressive contact elements 20—21 with the test circuit controlling element leading, and particularly when the lead exceeds a certain value it is desired to keep the trip coil circuit closed till after the shutter circuit has been broken, a shunt circuit $23^c$, shown in Figure 1 may be utilized,—said circuit including the brush contacts $20^a$—$21^a$ and having the terminals 94—95 adapted to be connected by the circuit closer 96 carried by the stem of the shutter when open.

Figure 1:
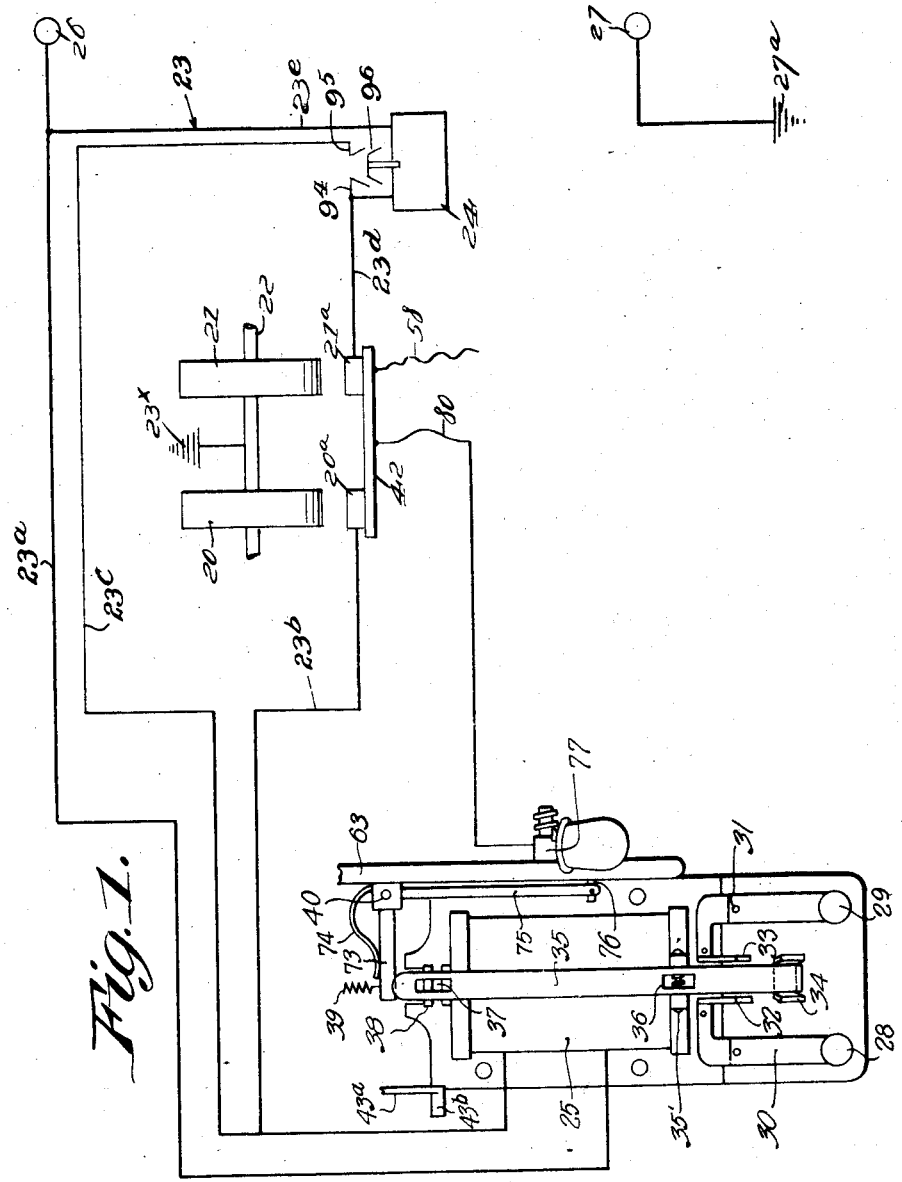
Figure 1 is a diagrammatic view of the wiring of an apparatus constructed in accordance with the invention.

To recapitulate the series of operations: Let it be assumed that the test circuit, in which is connected the galvanometer, is connected to the binding posts 28 and 29. The test circuit will, of course, be inactive so long as the circuit closer 34 is out of engagement with the contacts 32 and 33 and the circuit closer will be held out of such engagement when the latch 37 is engaged with the lever 35, as shown in Figure 1. The supply circuit from which the film motor is preferably driven is connected to the binding posts 26 and 27 and will thus serve to energize the magnet 25 when the oscillatory elements $20^a$ and $21^a$ are engaged with the rotary elements 20 and 21. The oscillatory elements, however, are precluded from engagement with the rotary elements so long as the trigger 57 is engaged with the carrier 42 but the rotary elements are moving as well as the film drum due to the rotation of the film motor. Upon the retraction of the trigger 57 by pulling on the cord 58, the former will be disengaged from the carrier 42 and the latter will immediately engage with the latch 56 on the trip arm 55. It is then in position to be released by the trip arm when the traveller 66 of the latter reaches the rise on the cam 67. The spring arm 54 will then move the carrier 42 to a position where the elements $20^a$ and $21^a$ will engage respectively with the rotary elements 20 and 21. The circuit will then be established through magnet 25, the current passing from the binding post 26 over the wire $23^a$ and through the winding of the magnet and thence over the wire $23^b$ to the contact element $20^a$, thence to the complementary rotary element 20 and thence to the ground $23^x$, reaching the binding post 27 through the ground $27^a$. At the same time the film shutter will be actuated, the magnets 87 and 88 being energized by the current which passes from the binding post 26 through the wire $23^e$, thence through the field magnets and through the wire $23^d$ to the contact element $21^a$, from which it passes to the rotary contact element 21 and thence back to the binding post 27 as did that portion which energized the magnet 25. The energization of the magnets 87 and 88 will result in rocking the oscillatory armature 89 from its normally diagonal position to a horizontal position and the armature carrying the film shutter 90, and the latter will be moved to open position. The shutter being thus opened and simultaneously with the energization of the magnet 25, the latch 37 will be withdrawn from engagement with the lever 35 and the circuit closer will be moved into engagement with the contacts 32 and 33 by the spring 36. The test circuit will thus be closed and the galvanometer will be actuated and the film being rotated by the same means driving the rotary elements 20 and 21, the movement of the galvanometer will be indicated on the film.

As explained above, it is essential that the trip magnet remain energized as long as the film shutter is open in order that the test circuit may remain in closed position during this time. Since the position of the current carrying member of the rotary element 21 may be so disposed relative to the corresponding element on the rotary element 20 that the circuit on the magnet 25 might be opened prior to the circuit on the magnets 87 and 88 and thus open the test circuit, means are provided in connection with the shutter mechanism to maintain a closed circuit on the magnet 25 despite opening of the latter by the contact element $20^a$ passing onto the insulating element 51. Such means comprises the terminals 94 and 95 and the circuit closer 96 which, when the shutter is in open position due to the armature 89 being in horizontal position, engages the contacts 94 and 95. Thus the circuit of the trip magnet 25 is retained intact through the shunt $23^c$, current passing from the binding post 26 through the wire $23^a$, the magnet 25, the shunt $23^c$, the contact 95, the circuit closer 96, the contact 94 and the wire $23^d$ to the oscillatory contact $21^a$ and thence to the rotary contact member 21 to the ground and to the binding post 27. By this arrangement, the magnet 25 is insured energization as long as the shutter opening magnets 87 and 88 are energized.

When the traveller 66 reaches the low point or fall of the cam, the trip arm 55 will be in a position to engage the carrier 42 when the latter is retracted and it is necessary that it be retracted if the operation is not to be repeated. The non-repeat mechanism referred to accomplishes this. In the normal position of the parts, that is, prior to making an exposure, the magnet 25 is inactive and the latch 37, while engaged with the trip lever 35, also engages the trip arm 73 of the rocking trip 40.

Upon making an exposure, the magnet 25 is energized and the trip lever 35 released but after the completion of the exposure, the magnet is deenergized when the rotary elements 20 and 21 are at such points that their insulated portions engage the oscillating elements 20ᵃ and 21ᵃ. The latch 37 is then released and rising, due to the action of the spring 39, engages the trip arm 73 of the non-repeat mechanism, and rocking arm 75, retracts the pin 76 which, relieved from engagement with the arm 77, allows the latter to drop and the flexible connection between it and the carrier 42 results in the attraction of the latter to a point where it reengages the trigger 57. Before another exposure may be made, it is necessary to reengage the arm 77 with the pin 76 which is done by elevating the arm 77 and depressing the trip arm 73 sufficiently to protrude the pin into the path of the arm 77. The apparatus is then ready for a second operation.

While the disclosure both as to the drawing and description sets forth a gear ratio between the driving means and the circuit closer which includes the rotary core and related parts of three to one, it will be understood that this ratio may be varied and may under certain conditions be desirable and the flexibility of the device in so far as its adaptation to various conditions of use will thereby be increased.

Moreover it should be noted that while various means of securing the cam 67 of the main circuit controller in its adjusted positions, may be utilized, the means particularly relied upon in the construction illustrated consists of the insulating ring 51 which is secured in place by the screws 71 locking the core member 49 to the core 48, and between which insulating ring and the ring 50 which carries the other progressive contact said cam is located. In other words the tightening of the fastening screw 71 after the cam ring has been adjusted serves to clamp the latter between the insulating rings 50 and 51 and thereby frictionally lock the cam through the core and in a fixed relation with the contact plates 52 and 53.

Having described the invention, what is claimed as new and useful is:—

1. In combination with a shutter operating mechanism and test current switch mechanism, an oscillograph timer having means for controlling said shutter and switch mechanisms and having members of which one is actuable in timed relation with the shutter operating mechanism, the said one member including independently active elements, and means for relatively varying the lead of said elements.

2. In combination with a shutter operating mechanism and test current switch mechanism, an oscillograph timer having means for controlling said shutter and switch mechanisms and having members of which one is actuable in timed relation with the shutter operating mechanism, the said one member including independently active elements, and means for reversing a lead of said elements.

3. In combination with a shutter operating mechanism and test current switch mechanism, an oscillograph timer having means for controlling said shutter and switch mechanisms and having members of which one is progressively movable in timed relation with the film exposed by said shutter operating mechanism and the other is movable into and out of the path of the former, said progressively movable member including elements for respective engagement by complemental elements of the second named member.

4. In combination with a shutter operating mechanism and test current switch mechanism, an oscillograph timer having means for controlling said shutter and switch mechanisms and having members of which one is progressively movable in timed relation with the film exposed by said shutter operating mechanism and the other is movable into and out of the path of the former, said progressively movable member including elements for respective engagement by complental elements of the second named member, and adjustable means for the elements of one of said members to vary the relative lead of said shutter and switch mchanism controlling means.

5. In combination with a shutter operating mechanism and test current switch mechanism, an oscillograph timer having means for controlling said shutter and switch mechanisms and having members of which one is progressively movable in timed relation with the film exposed by said shutter operating mechanism and the other is movable into and out of the path of the former, said progressively movable member including elements for respective engagement by complemental elements of the second named member, and adjustable means for the elements of one of said members to reverse the relative lead of said shutter and switch mechanism controlling means.

6. In combination with the shutter actuating and test current switch mechanisms of an oscillograph, a timer having a circuit closer for controlling said mechanisms and having members of which one consists of independent elements progressively movable in relation to and in contact with the other member, and means for adjusting one of the members to vary the interval of the time of movement of the other member.

7. In combination with the shutter actuating and test current switch mechanisms of an oscillograph, a timer having a circuit closer for controlling said mechanisms and having members of which one consists of independent elements progressively movable in relation to and in contact with the other member, and means for adjusting the elements of the first named member to vary the interval of time of movement of the other member.

8. In combination with shutter actuating and test current switch mechanisms of an oscillograph, a timer having a circuit closer for controlling said mechanisms and having two members of which the first consists of independent elements progressively movable in timed relation to and in contact with the second member and in timed relation with the film exposed by said shutter actuating mechanism, the second named member being movable into and out of the paths of movement of the elements of the first named member.

9. In combination with shutter actuating and test current switch mechanisms of an oscillograph, a timer having a circuit closer for controlling said mechanisms and having two members of which the first consists of independent elements progressively movable in timed relation to and in contact with the second member and in timed relation with the film exposed by said shutter actuating mechanism, the second named member being movable into and out of the paths of movement of the elements of the first named member and being actuable in timed relation with the shutter actuating mechanism.

10. In combination with shutter actuating and test current switch mechanisms of an oscillograph, a timer having a circuit closer for controlling said mechanisms and having two members of which the first consists of independent elements progressively movable in timed relation to and in contact with the second member and in timed relation with the film exposed by said shutter actuating mechanism, the second named member being movable into and out of the paths of movement of the elements of the first named member, and actuating means for the second said member controlled by the progressive movement of the first said member.

11. In combination with the shutter actuating and test current switch mechanisms of an oscillograph, a timer having a circuit closer for controlling said mechanisms and having two members of which the first consists of independent elements progressively movable in relation to and in contact with the second member and in timed relation with the film exposed by said shutter actuating mechanism, the second named member being movable into and out of the paths of movement of the elements of the first named member, and actuating means for the second named member operating in timed relation with the elements of the first named member.

12. In combination with the shutter actuating and test current switch mechanisms of an oscillograph, a timer having a circuit closer for controlling said mechanisms and having two members of which the first includes independent elements progressively movable in relation to and in contact with the second member and in timed relation with the film exposed by said shutter actuating mechanism, the second named member being movable into and out of the paths of movement of the elements of the first named member, and actuating means for the second named member operating in timed relation with the elements of and carried by the first named member, said actuating means being adjustable to vary the time element involved in the operation of said members.

13. In combination with the shutter actuating and test current switch mechanisms of an oscillograph, a timer having a circuit closer for controlling said mechanisms and having two members of which the first includes independent elements progressively movable in relation to and in contact with the second member and in timed relation with the film exposed by said shutter actuating mechanism, the second named member being movable into and out of the paths of movement of the elements of the first named member, and actuating means for the second named member operating in timed relation with the elements of and carried by the first named member, said means being adjustable progressively to vary the lead of relation of said members.

14. In combination with the shutter actuating and test current switch mechanisms of an oscillograph, a timer having a circuit closer for controlling said mechanisms and having two members of which the first includes independent elements progressively movable in relation to and in contact with the second member and in timed relation with the film exposed by said shutter actuating mechanism, the second named member being movable into and out of the paths of movement of the elements of the first named member, and actuating means for the second named member operating in timed relation with the first named member and adjustable progressively in relation thereto and adjustable progressively in relation respectively to the elements of the first named member.

15. In combination with the shutter actuating and test current switch mechanisms of an oscillograph, a timer having means for moving the oscillograph film and also having members of which the first consists of independent elements progressively movable in relation to and in contact with the second and in timed relation with the film moving means, the second named member being movable into and out of the path of the first named member and yieldingly impelled in one direction, and trip mechanism controlled synchronously with the first named member for releasing the second named member.

16. In combination with the shutter actuating and test current switch mechanisms of an oscillograph, a timer having means for moving the oscillograph film and also having members of which the first consists of independent elements progressively movable in relation to and in contact with the second and in timed relation with the film moving means, the second named member being movable into and out of the path of the first named member and yieldingly impelled toward the path thereof, and trip mechanism controlled synchronously with the first named member for releasing the second named member.

17. In combination with the shutter actuating and test current switch mechanisms of an oscillograph, a timer having means for moving the oscillograph film and also having members of which the first consists of independent elements progressively movable in relation to and in contact with the second and in timed relation with the film moving means, the second named member being movable into and out of the path of the first named member, and means controlled by the test current switch mechanism for effecting one of said movements of the second named member.

18. In combination with the shutter actuating and test current switch mechanisms of an oscillograph, a timer having a film driving means and also having members of which the first consists of independent elements progressively movable in relation to and in contact with the second and in timed relation with the film driving means, said second named member being movable into and out of the paths of movement of the elements of the first named member, and means controlled by the test current switch mechanism for effecting the latter movement of said second named member.

19. In combination with the shutter actuating and test current switch mechanisms of an oscillograph, a timer having film driving means and also having members of which the first consists of independent elements progressively movable in relation to and in contact with the second and in timed relation with the film driving means, the second named member being movable into and out of the paths of movement of the elements of the first named member, a circuit comprising the shutter actuating mechanism and both of said members, and means controlled by the test current switch mechanism for effecting circuit opening movement of said members.

20. In combination with the shutter actuating and test current switch mechanisms of an oscillograph, a timer having film driving means and further having members of which the first consists of independent elements progressively movable in relation to and in contact with the second and in timed relation with the film driving means, a second member being movable into and out of the paths of movement of the elements of the former, the progressively movable member having a revoluble core contact carrying element and insulating rings revolubly mounted thereon, and means for locking said rings.

21. In combination with the shutter actuating and test current switch mechanisms of an oscillograph, a timer having a circuit closer provided with film driving means and having members of which the first consists of independent elements progressively movable in relation to and in contact with the second and in timed relation with the film driving means, the second named member being movable into and out of the paths of movement of the elements of the first named member and the latter having a revoluble core carrying insulated contact element, the second named member having a yieldingly impelled carrier, a latch for restraining the carrier, and a latch tripping means actuable by the core.

22. In combination with the shutter actuating and test current switch mechanisms of an oscillograph, a timer having a circuit closer provided with film driving means and having members of which the first consists of independent elements progressively movable in relation to and in contact with the second and in timed relation with the film driving means, the second named member being movable into and out of the paths of movement of the elements of the first named member and the latter having a revoluble core carrying insulated contact element, the second named member having a yieldingly impelled carrier, a latch for restraining the carrier, a latch tripping means actuable by the core and consisting of a cam carried by the core, and a follower traversing the same.

23. In combination with the shutter actuating and test current switch mechanisms of an oscillograph, a timer having a circuit closer provided with film driving means and having members of which the first consists of independent elements progressively movable in relation to and in contact with the second and in timed relation with the film driving means, the second named member being movable into and out of the paths of movement of the elements of the first named member, and means controlled by the first named member for moving the second named member into operative position.

24. In combination with the shutter actuating and test current switch mechanisms of an oscillograph, a timer having a circuit closer provided with film driving means and having members of which the first consists of independent elements progressively movable in relation to and in contact with the second and in timed relation with the film driving means, the second named member bieng movable into and out of the paths of movemet of the elements of the first named member, and means controlled by the test current switch mechanism for preventing operative movement of the second named member.

In testimony whereof he affixes his signature.

JETSON O. BENTLEY.